March 11, 1941. H. C. SCHLICKER Re. 21,747
HAIR-DRESSING TOOL
Original Filed April 27, 1938
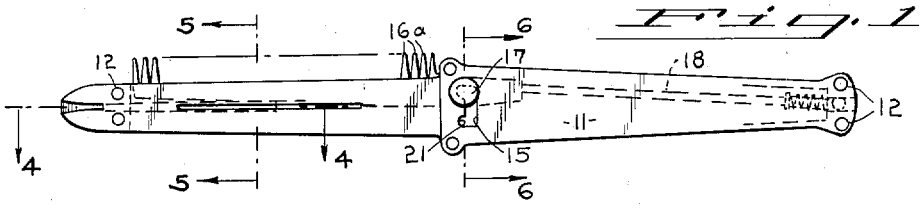
Fig. 1.
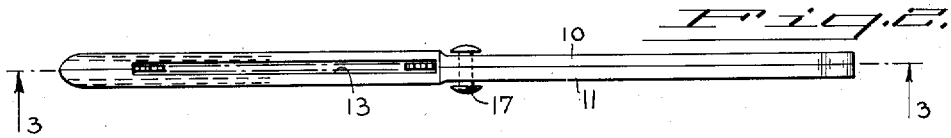
Fig. 2.
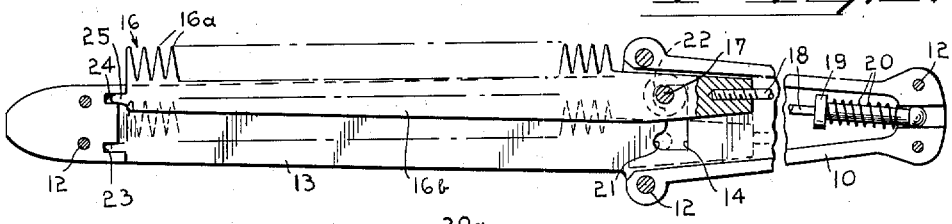
Fig. 3.
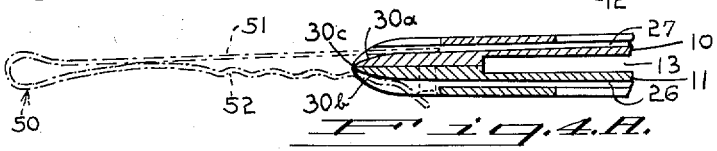
Fig. 4.A.
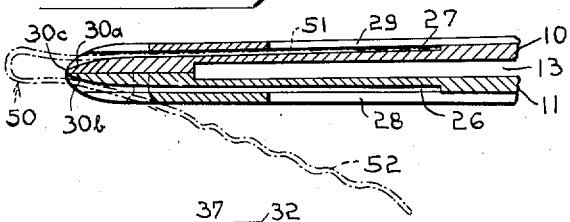
Fig. 4.B.
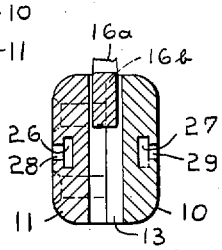
Fig. 5.
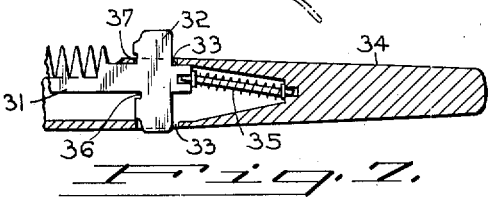
Fig. 7.
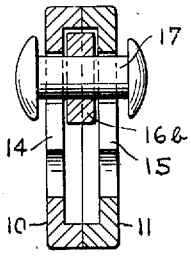
Fig. 6.
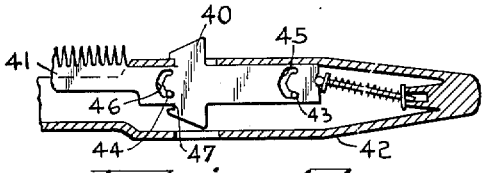
Fig. 8.
INVENTOR.
Herman C. Schlicker
BY
Denis J. Murnane
his ATTORNEY.

Reissued Mar. 11, 1941

Re. 21,747

UNITED STATES PATENT OFFICE 21,747

HAIR-DRESSING TOOL

Herman C. Schlicker, Brooklyn, N. Y., assignor to Rollocurl Corporation, New York, N. Y., a corporation of New York Original No. 2,148,393, dated February 21, 1939, Serial No. 204,557, April 27, 1938. Application for reissue February 10, 1940, Serial No. 318,376

21 Claims. (Cl. 132—35)

The present invention relates to hair-dressing tools and is more particularly directed toward such tools embodying a retractable comb for winding the strands of a lock of hair in spaced relationship to form a regularly defined spiral curl, in association with a hair pin carried by such tool during the formation of the curl and adapted to clamp and support the formed curl as the same is removed from the tool.

The invention further contemplates a structure for winding and setting a lock of hair to form a regularly defined spiral curl, in the nature of a sheath or mandrel provided with a longitudinally extending slot in which is mounted for transverse displacement and longitudinal movement a retractable comb, the teeth of which define spacing means for the strands of the lock of hair; the end of the mandrel or sheath being of such conformation as to provide for the reception and maintenance of a hair pin under tension at the end thereof and spaced from the hair winding zone.

According to the present invention the comb is urged in one longitudinal direction by a spring and is manually movable in the other longitudinal direction before it can be shifted transversely to either project the teeth of the comb out of the body member or conceal it within the body member. The invention also contemplates suitable interengaging elements carried by the comb and the body member whereby the comb is supported at two points so as to prevent collapsing the comb, except when it is longitudinally moved to release the cooperative elements.

The invention specifically contemplates an improved dressing tool incorporating in conjunction with the retractable comb laterally displaceable in and out of the longitudinal slot in the mandrel or sheath, an end formation for the mandrel or sheath which provides for the support in spread formation and under tension of a hair pin in a position longitudinally spaced of the slot of the mandrel or sheath and the retractable comb mounted therein, so that after a lock of hair has been wound about the comb and sheath to form a spiral curl and the comb withdrawn into the slot, the curl may be slid along the mandrel or sheath and clamped between the shanks of the spread hair pin supported as aforesaid at the end of the mandrel or sheath.

The accompanying drawing shows, for purposes of illustrating the present invention, three embodiments in which the invention may take form, it being understood that the drawing is illustrative of the invention rather than limiting the same. In the drawing:

Figure 1 is a side elevational view of a hair-dressing tool;

Figure 2 is an elevational view taken from the top of Figure 1;

Figure 3 is an enlarged view taken on the line 3—3 of Figure 2;

Figure 4*a* is an enlarged view taken along lines 4—4 of Figure 1 showing the disposition of the hair pin during the curl winding operation;

Figure 4*b* is an enlarged view taken along lines 4—4 of Figure 1 showing the disposition of the hair pin after the winding of the curl prior to transference thereof from the sheath to the hair pin.

Figures 5 and 6 are transverse sectional views taken on the lines 5—5 and 6—6 respectively, of Figure 1; and Figures 7 and 8 are fragmentary views illustrating modified forms of construction.

The body of the hair-dressing tool is preferably formed of two substantially similar halves indicated at 10 and 11. These may be made of metal or suitable molded or stamped material. When made of metal or molded material the parts are held together by rivets, screws or pins, such as indicated at 12.

The body members 10 and 11 are shaped to provide a longitudinally extending slot 13 and have side openings indicated at 14 and 15. A retractable comb 16 having spaced teeth 16*a* and a back 16*b* extends longitudinally of the slot 13. Its right-hand end, as indicated in the drawing, is connected with a pin or finger piece 17 which extends through the slots 14 and 15. The extreme right-hand end of the comb member is connected to a flexible rod 18 which extends through the handle end of the body member as shown. This rod 18 is provided with a collar, indicated at 19, and a spring 20 acts on this collar to urge the rod 18 and the comb to the left.

The slots 14 and 15 have notches at the ends indicated at 21 and 22 into which the spring 20 is adapted to force the cross-pin 17, and the body member is provided with notches 23 and 24 to receive a prong 25 on the left or outer end of the comb member.

When the retractable comb 16 is in the full line position shown in Figure 3 or in the position shown in Figure 1, the spring 20 pushes the pin 17 into the notch 22 and the prong 25 into the notch 24. This acts to hold the comb against collapsing. To shift the comb to the enclosed position pressure is applied on the finger piece 17 to shift it to the right, thereby releasing the engaged parts just referred to and slightly pressing the spring so that, when the comb is moved down to the dot-and-dash position of Figure 3, it is moved to the left by the spring, at the same time any foreign matter in the slot is pushed out. The parts are preferably dimensioned so that the rod 18 is flexed slightly when the comb is in either extreme position. This holds the parts more tightly together and avoids looseness or rattling.

At the end of the mandrel or sheath there is formed a plurality of longitudinal slots 26 and 27 which extend inwardly from the outer end of the mandrel or sheath defined by the body. These slots are open as at 28 and 29 to facilitate cleaning, while such slots are defined at the extreme end of the mandrel or sheath by arcuate tapered sections 30*a* and 30*b* merging at the free end of the mandrel or sheath to provide at the apex 30*c* an angular formation serving to facilitate the spreading of the hair pin 50.

The hair pin, which is the well-known "bob pin," is of a formation providing a straight shank 51 and a sinuous shank 52, the contour of the ridges and valleys of the sinuous shank conforming and complementary to the contour of the arcuate tapered sections 30*a* and 30*b*. In use in my hair dressing tool the hair pin is applied to the end of the mandrel or sheath by inserting the straight shank 51 thereof into either the slot 26 or 27 and urged inwardly as shown in Figure 4*a* for a short distance, sufficient to be spread by the angular formation 30*c* while the sinuous shank 52 of the hair pin H assumes a position with one of its arcuate ridges or valleys contiguous with the complementary arcuate formation of the section 30*a* or 30*b*. The tension of the hair pin as spread at the end of the mandrel or sheath (see Figure 4*a*) is sufficient to maintain the hair pin in longitudinally spaced relationship with respect to the teeth of the retractable comb defining the zone in which the lock of hair is curled by winding.

The slots 26 and 27 are of such length, however, that after the lock of hair is wound to form a curl and the comb 16 is retracted inwardly of the slot 13, the hair pin H may be urged inwardly with further spreading between the shanks 51 and 52 to the position shown in Figure 4*b*, wherein the sinuous shank of the hair pin extends substantially along the length of the formed curl. The curl is separated from the mandrel or sheath by withdrawing the sheath relative to the hair pin while the sinuous shank 52 in contact with the outer periphery of the curl, maintains the longitudinal formation of the curl, and the straight inner shank 51 of the hair pin gradually increases its longitudinal contact with the inner periphery of the curl as the tension against the shanks of the hair pin is gradually released by virtue of the relative movement of the mandrel or sheath and the hair pin.

In the arrangement shown in Figure 7 the comb body 31 is provided with a finger piece 32 which extends through slot 33 in the body member 34. The comb is urged to the left by coiled spring indicated at 35, and the finger piece 32 has slots indicated at 36 and 37 to engage with the material at the left edge of the slot 33. The left or outer end of the comb 31 would be provided with a prong similar to the prong 25 to cooperate with recesses in the body member similar to the recesses 23 and 24.

In the arrangement shown in Figure 8 the finger piece 40 attached to the comb body 41 is similar to the finger piece 32, but instead of having the free end of the comb supported in the manner above referred to, the parts are held in alignment by providing the body member 42 with two pins 43 and 44 adapted to be received in slots 45 and 46 in the comb member. These two pin-and-slot arrangements are spaced far enough apart to hold the comb against being collapsed unintentionally. The pins cooperate with the slots or notches 47 in the finger piece 40 to hold the parts together in a very secure manner.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. A collapsible comb having a slotted body member, a comb member therein, means for guiding the comb member for longitudinal and transverse movement in the slot, means to prevent transverse movement except when preceded by a longitudinal movement out of a normal position, and a spring biasing the comb member to said normal longitudinal position and holding the comb member in the transverse position into which it has been shifted.

2. In combination, a comb member having a back and teeth, a comb carrier having a longitudinally extending slot to receive the comb member, a spring acting on the comb member to push it longitudinally of the slot, an externally accessible finger piece secured to the comb member and operable to compress the spring and shift the comb member transversely of the slot, and cooperative devices carried by the comb member and the carrier for holding the comb member in either of the selected transverse positions, the spring acting to hold said devices in cooperative relationship.

3. A hair-dressing tool comprising a longitudinally slotted body member, a comb mounted in the slot for limited movement longitudinally of the slot and for transverse movement to conceal or expose the teeth of the comb, a spring normally holding the comb in one of its longitudinal positions, a finger piece for moving the comb longitudinally against said spring and for moving it transversely, and interengaging elements for holding the comb against transverse movement except when it is shifted by the finger piece.

4. A hair-dressing tool comprising a body having a handle end and a longitudinally slotted end, a comb housed in the slotted end and extending into the handle end, means for manually shifting the comb longitudinally of the slot and transversely of the slot, a spring compressed when the comb is manually shifted and acting when the manual pressure is released to shift the comb away from the handle end of the body, and comb carried elements engageable with body carried elements for preventing transverse movement of the comb except when the spring is compressed.

5. A hair-dressing tool comprising a body having a handle end and a longitudinally slotted end, a comb housed in the slotted end and extending into the handle end, a finger piece secured to said comb and extending out through a slot in the body member, the finger piece being longitudinally and transversely movable and shifting the comb longitudinally and transversely, an over the center spring compressed when the comb is shifted toward the handle end, and acting to aid the transverse shifting of the comb and means to prevent transverse movement except when the spring is compressed.

6. A hair-dressing tool such as claimed in claim 5, wherein said means comprises two notches at the remote end of the body member and a prong in the comb.

7. A hair-dressing tool such as claimed in claim 5, wherein the finger piece is exposed on opposite sides of the longitudinal slot of the body member.

8. A hair-dressing tool such as claimed in claim 5, wherein the slot through which the finger piece extends has two notches into which the spring forces the finger piece.

9. A hair-dressing tool such as claimed in claim 5, wherein the finger piece has notches engageable with the body member when the spring is in expanded position.

10. A hair-dressing tool comprising a body member having a comb-receiving slot extending lengthwise thereof and opening at the opposite sides of the body member and an insert having a backing and comb teeth, the insert being movable laterally of the slot to expose the teeth, or to be confined therein, so that a coil of hair wound thereon may be slidably removed, the backing extending to the edge of the slot when the insert is confined in the slot so that foreign matter in the slot is pushed out of the slot.

11. A hair-dressing tool comprising a body member slotted to receive a comb and having openings longitudinally extending from the end of the body member down alongside the comb receiving slot and adapted to receive one shank of a hairpin, the end of the body member being wedge-shaped between the slots to facilitate spreading the hairpin irrespective of which opening is occupied by the inserted shank.

12. A hair-dressing tool comprising a body having a longitudinally extending comb-receiving slot, a comb movable laterally of the slot to be exposed or to be confined within the slot so that a coil of hair wound on the body may be slidably removed, the body having an opening extending inwardly from the end, and a hairpin having one shank slidably receivable in the opening, the end of the body adjacent the opening being of a thickness to spread the hairpin so that the free shank is opened to admit the coil of hair as it is removed over the end of said body.

13. A hair-dressing tool as in claim 12, wherein the inserted shank of the hairpin extends past the end of the comb-receiving slot.

14. A hair-dressing tool as in claim 12, wherein the inserted shank fits the opening so that the hairpin is non-rotatable and is oriented in a definite angular relation to the comb.

15. A hair-dressing tool comprising a body member having a longitudinal slot spaced from one end thereof to receive a retractable comb and having an opening extending longitudinally from the said end of the body member and adapted to receive one shank of a hair pin, the end of the body member incorporating the opening being of such thickness to spread the hair pin.

16. A hair-dressing tool comprising a body member slotted to receive a retractable comb and having an opening extending longitudinally from the end of the body member and adjacent the comb receiving slot, and adapted to receive one shank of a hair pin, the end of the body member incorporating the opening being of a thickness and conformation to spread the hair pin and maintain the same under tension at a location spaced longitudinally of the comb receiving slot.

17. A hair-dressing tool comprising a body member, a comb intermediate the ends of said body member and laterally retractable with respect thereto, and a resilient hair pin mounted at one of the ends of said body member, the end of said body member mounting the hair pin being of such conformation as to spread the hair pin as the same is urged towards the retractable comb.

18. A hair-dressing tool comprising a body member, a comb intermediate the ends of said body member and laterally retractable with respect thereto, and a resilient hair pin mounted at one of the ends of said body member, and spaced from the retractable comb, the end of said body member mounting the hair pin being of such conformation as to spread the hair pin as the same is urged towards the retractable comb.

19. A hair-dressing tool comprising a body having a longitudinally extending comb receiving slot spaced from an end thereof, a comb movable laterally of the slot to be exposed or confined within the slot, so that a lock of hair may be spacedly wound on the body and thereafter slidably removed, the body having an opening extending inwardly and longitudinally from the aforesaid end, and a resilient hair pin having one shank slidably receivable in the opening, the end of the body incorporating the opening being of a thickness to spread the hair pin, so that the hair pin is maintained under tension at the end of the body member.

20. A hair-dressing tool comprising a body having a longitudinally extending comb receiving slot spaced from an end thereof, a comb movable laterally of the slot to be exposed or confined within the slot, so that a coil of hair may be spacedly wound on the body and thereafter slidably removed, the body having an opening extending inwardly and longitudinally from the aforesaid end, and a resilient hair pin having at least one sinuous shank, and having the other shank slidably receivable in the opening, the end of the body adjacent the opening being of a thickness to spread the hair pin and of a contour substantially complementary to the sinuous conformation of the shank spread thereby, whereby the hair pin is maintained as spread under tension at the end of the body and longitudinally spaced from that portion of the body of the hair dressing tool about which the coil of hair is wound.

21. A hair-dressing tool comprising a body member slotted longitudinally, a comb laterally retractable in said slot, such slot being spaced from the ends of said body member, an opening extending longitudinally from one end of the body member and adapted to receive one shank of a hair pin, and a resilient hair pin disposed so that one shank thereof is slidable in said opening, the end of the body member adjacent the opening being of such thickness to spread the shanks of the hair pin carried in said opening.

HERMAN C. SCHLICKER.